United States Patent
Liu

(10) Patent No.: US 11,465,240 B2
(45) Date of Patent: Oct. 11, 2022

(54) METHOD AND APPARATUS FOR REAL TIME, IN SITU SENSING AND CHARACTERIZATION OF ROUGHNESS, GEOMETRICAL SHAPES, GEOMETRICAL STRUCTURES, COMPOSITION, DEFECTS, AND TEMPERATURE IN THREE-DIMENSIONAL MANUFACTURING SYSTEMS

(71) Applicant: Jian Liu, Saratoga, CA (US)

(72) Inventor: Jian Liu, Saratoga, CA (US)

(73) Assignee: PolarOnyx, Inc., Chapel Hill, NC (US)

(*) Notice: Subject to any disclaimer, the term of this patent is extended or adjusted under 35 U.S.C. 154(b) by 856 days.

(21) Appl. No.: 16/378,485

(22) Filed: Apr. 8, 2019

(65) Prior Publication Data

US 2020/0316720 A1    Oct. 8, 2020

(51) Int. Cl.
*B23K 26/34* (2014.01)
*B33Y 10/00* (2015.01)
(Continued)

(52) U.S. Cl.
CPC ............ *B23K 26/354* (2015.10); *B22F 10/20* (2021.01); *B22F 10/28* (2021.01); *B22F 10/30* (2021.01);
(Continued)

(58) Field of Classification Search
CPC .......... B22F 10/20; B22F 10/28; B22F 10/30; B22F 10/36; B22F 10/50; B22F 12/90;
(Continued)

(56) References Cited

U.S. PATENT DOCUMENTS 9,533,375 B2   1/2017   Cho et al.
9,886,015 B2   2/2018   Wilson et al.
(Continued)

OTHER PUBLICATIONS

Yang, Teng et al. "A Review of Diagnostics Methodologies for Metal Additive Manufacturing Processes and Products." Materials (Basel, Switzerland) vol. 14,17 4929. Aug. 30, 2021, doi:10.3390/ma14174929. (Year: 2021).*

*Primary Examiner* — Mark R Gaworecki
(74) *Attorney, Agent, or Firm* — Taboada Law Firm, PLLC; John M. Taboada

(57) ABSTRACT

Methods and apparatuses for manufacturing are disclosed, including (a) providing an apparatus having: a laser; scanner; powder injection system; powder spreading system; dichroic filter; imager-and-processor; and computer; (b) programming the computer with specifications of a sample; (c) using the computer to set initial parameters based on the sample specifications; (d) adjusting a stage to position the sample; (e) focusing and scanning electromagnetic radiation onto the sample while powder is concurrently injected onto the sample in order to deposit a layer; (f) capturing two-dimensional images of the sample and probing the sample to determine whether the deposited layer was manufactured per the specifications; (g) use the computer to adjust the three-dimensional manufacturing parameters based on the determination made in step (f) prior to additively manufacturing a subsequent layer or making repairs; and (h) repeating steps (d), (e), (f), and (g) until the manufacture is complete. Other embodiments are described and claimed.

21 Claims, 10 Drawing Sheets

(51) Int. Cl.
| | |
|---|---|
| *B33Y 30/00* | (2015.01) |
| *B33Y 50/02* | (2015.01) |
| *G01N 21/19* | (2006.01) |
| *G01N 21/71* | (2006.01) |
| *G01N 21/88* | (2006.01) |
| *G01N 21/17* | (2006.01) |
| *G01B 11/30* | (2006.01) |
| *B22F 10/20* | (2021.01) |
| *B22F 10/36* | (2021.01) |
| *B22F 10/28* | (2021.01) |
| *B22F 10/30* | (2021.01) |
| *B22F 10/50* | (2021.01) |
| *B22F 12/90* | (2021.01) |
| *B29C 64/393* | (2017.01) |
| *B23K 26/354* | (2014.01) |
| *G01J 5/00* | (2022.01) |
| *G01J 5/80* | (2022.01) |

(52) U.S. Cl.
CPC .............. *B22F 10/36* (2021.01); *B22F 10/50* (2021.01); *B22F 12/90* (2021.01); *B23K 26/34* (2013.01); *B29C 64/393* (2017.08); *B33Y 10/00* (2014.12); *B33Y 30/00* (2014.12); *B33Y 50/02* (2014.12); *G01B 11/30* (2013.01); *G01B 11/303* (2013.01); *G01J 5/0003* (2013.01); *G01N 21/1702* (2013.01); *G01N 21/19* (2013.01); *G01N 21/718* (2013.01); *G01N 21/88* (2013.01); *B22F 2999/00* (2013.01); *G01J 5/80* (2022.01); *G01J 2005/0077* (2013.01); *G01N 2021/1706* (2013.01); *G01N 2201/06113* (2013.01); *Y02P 10/25* (2015.11)

(58) Field of Classification Search
CPC ... B22F 2999/00; B23K 26/34; B23K 26/354; B29C 64/393; B33Y 10/00; B33Y 30/00; B33Y 50/02; G01B 11/30; G01B 11/303; G01J 5/0003; G01J 5/80; G01J 2005/0077; G01N 21/1702; G01N 21/19; G01N 21/718; G01N 21/88; G01N 2021/1706; G01N 2201/06113; Y02P 10/25

See application file for complete search history.

(56) References Cited

U.S. PATENT DOCUMENTS

| | | | |
|---|---|---|---|
| 10,043,257 | B2 | 8/2018 | Ladewig |
| 10,124,410 | B2 | 11/2018 | Kanko et al. |
| 2016/0114425 | A1* | 4/2016 | Liu .................. B23K 26/0624 219/76.12 |
| 2019/0118300 | A1* | 4/2019 | Penny .................... B33Y 50/02 |
| 2020/0230745 | A1* | 7/2020 | Komsta .................. B23K 26/03 |
| 2020/0333295 | A1* | 10/2020 | Schiffres ................. B22F 12/90 |
| 2021/0129220 | A1* | 5/2021 | Liu .......................... B22F 10/00 |
| 2021/0205882 | A1* | 7/2021 | Liu .......................... C22C 1/045 |

* cited by examiner

METHOD AND APPARATUS FOR REAL TIME, IN SITU SENSING AND CHARACTERIZATION OF ROUGHNESS, GEOMETRICAL SHAPES, GEOMETRICAL STRUCTURES, COMPOSITION, DEFECTS, AND TEMPERATURE IN THREE-DIMENSIONAL MANUFACTURING SYSTEMS

I. STATEMENT REGARDING FEDERALLY SPONSORED RESEARCH

The U.S. Government has a paid-up license in this invention and the right in limited circumstances to require the patent owner to license others on reasonable terms as provided for by the terms of the contract GRANT NO. DE-SC0018826, for a small business innovation research (SBIR) project entitled "Controllable 3D Manufacturing System" awarded by the Department of Energy and for a DARPA SBIR Contract No. 140D6318C0078 entitled "Real-Time Metrology and Feedback Control for Additive Manufacturing".

II. BACKGROUND

The invention relates generally to the field of three-dimensional manufacturing systems. More particularly, the invention relates to a method and apparatus for real time, in situ sensing and characterization of roughness, geometrical shapes, geometrical structures, composition, defects, and temperature in three-dimensional manufacturing systems.

III. SUMMARY

In one respect, disclosed is a method for real time, in situ sensing and characterization of roughness, geometrical shapes, geometrical structures, composition, defects, and temperature in three-dimensional manufacturing comprising: (a) providing an apparatus having: one or more lasers configured to generate electromagnetic radiation; an autofocusing scanner configured to receive the electromagnetic radiation from the one or more lasers and to focus and scan the electromagnetic radiation onto a stage where a sample is three-dimensionally manufactured; a powder injection system configured to inject one or more powders toward the stage in the vicinity of the focused electromagnetic radiation; a powder spreading system configured to spread one or more powders to form a powder layer onto a previously processed layer of the sample; a dichroic filter positioned between the autofocusing scanner and the stage; an imager and processor focused through the dichroic filter and onto the sample, wherein the imager and processor are configured to monitor structure, temperature, shape, defects, cracks, and roughness of the sample; a non-destructive probing inspection system configured to monitor the composition of the sample; and one or more computers coupled to the one or more lasers, the autofocusing scanner, the stage, the powder injection system, the powder spreading system, the imager and processor, and the non-destructive probing inspection system and configured to monitor in about real-time one or more three-dimensional manufacturing parameters and provide control feedback to the apparatus; (b) programming the one or more computers with structural and material specifications of the sample; (c) using the one or more computers to set initial laser, scan parameters, and powder injection and/or spreading parameters based on the structural and material specifications of the sample programmed into the one or more computers; (d) adjusting the stage in order to position the sample within the scanning and focus range of the electromagnetic radiation; (e) using the autofocusing scanner to focus and scan the electromagnetic radiation onto the sample while powder is concurrently injected by the powder injection system and/or spreading system onto the sample in order to deposit a layer onto the sample; (f) use the imager and processor to capture two-dimensional images of the sample and the non-destructive probing inspection system to probe the sample to make a determination of whether or not the deposited layer was manufactured per the structural and material specifications of the sample; (g) using the one or more computers to adjust the one or more three-dimensional manufacturing parameters based on the determination made in step (f) prior to either additively manufacturing a subsequent layer onto the sample or making repairs to the deposited layer; and (h) repeating steps (d), (e), (f), and (g) until the three-dimensional manufacture of the sample is complete.

In another respect, disclosed is an apparatus for real time, in situ sensing and characterization of roughness, geometrical shapes, geometrical structures, composition, defects, and temperature in three-dimensional manufacturing comprising: one or more lasers configured to generate electromagnetic radiation; an autofocusing scanner configured to receive the electromagnetic radiation from the one or more lasers and to focus and scan the electromagnetic radiation onto a stage where a sample is three-dimensionally manufactured; a powder injection system configured to inject one or more powders toward the stage in the vicinity of the focused electromagnetic radiation; a powder spreading system configured to spread one or more powders to form a powder layer onto a previously processed layer of the sample; a dichroic filter positioned between the autofocusing scanner and the stage; an imager and processor focused through the dichroic filter and onto the sample, wherein the imager and processor are configured to monitor structure, temperature, shape, defects, cracks, and roughness of the sample; a non-destructive probing inspection system configured to monitor the composition of the sample; and one or more computers coupled to the one or more lasers, the autofocusing scanner, the stage, the powder injection system, the powder spreading system, the imager and processor, and the non-destructive probing inspection system and configured to monitor in about real-time one or more three-dimensional manufacturing parameters and provide control feedback to the apparatus.

Numerous additional embodiments are also possible.

IV. BRIEF DESCRIPTION OF THE DRAWINGS

Other objects and advantages of the invention may become apparent upon reading the detailed description and upon reference to the accompanying drawings.

Figure 1:
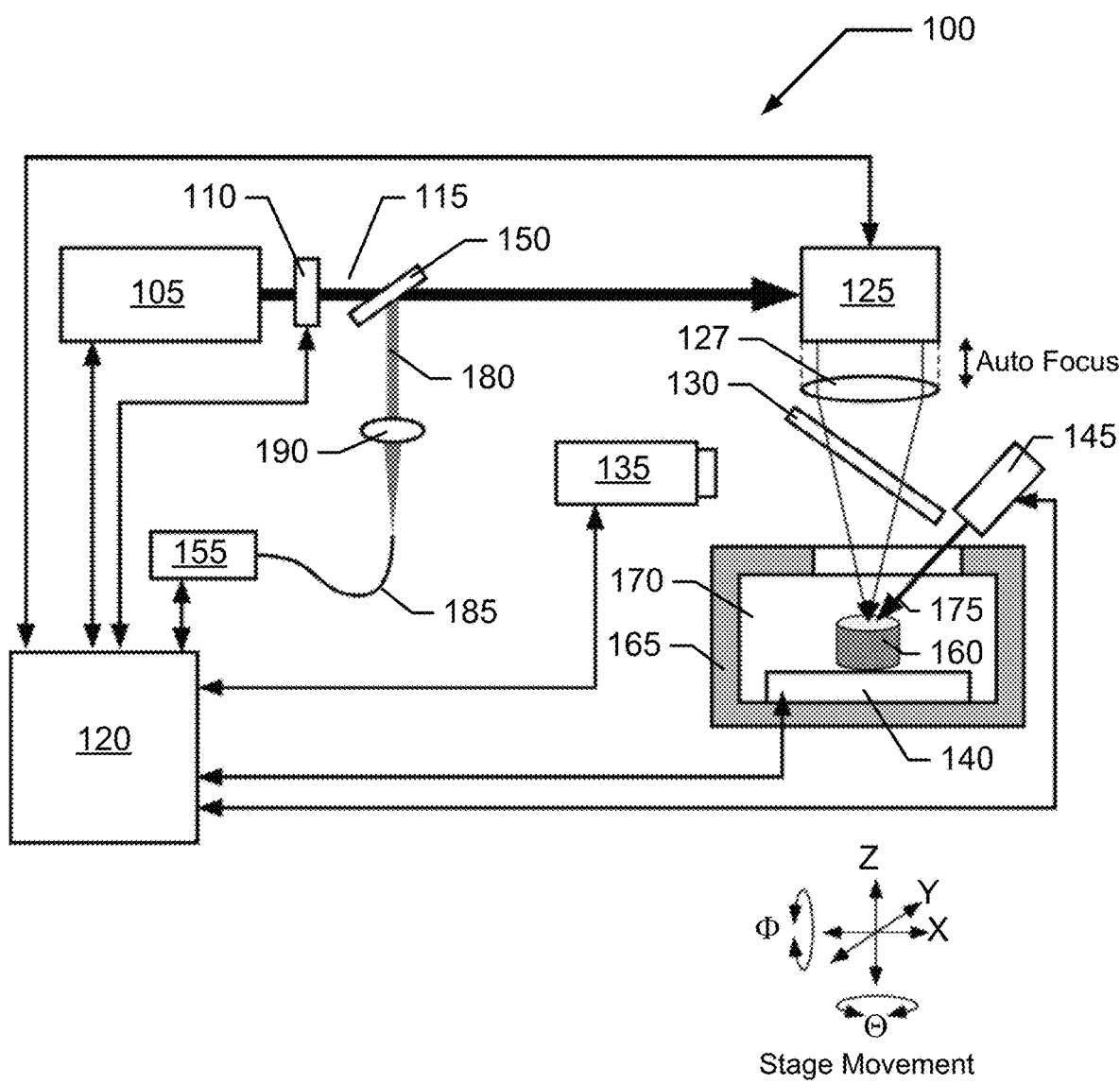
FIG. 1 is a schematic illustration of an apparatus for real time, in situ sensing and characterization of roughness, composition, defects, and temperature in three-dimensional manufacturing, in accordance with some embodiments.

While the invention is subject to various modifications and alternative forms, specific embodiments thereof are shown by way of example in the drawings and the accompanying detailed description. It should be understood, however, that the drawings and detailed description are not intended to limit the invention to the particular embodiments. This disclosure is instead intended to cover all modifications, equivalents, and alternatives falling within the scope of the present invention as defined by the appended claims.

V. DETAILED DESCRIPTION

One or more embodiments of the invention are described below. It should be noted that these and any other embodiments are exemplary and are intended to be illustrative of the invention rather than limiting. While the invention is widely applicable to different types of systems, it is impossible to include all of the possible embodiments and contexts of the invention in this disclosure. Upon reading this disclosure, many alternative embodiments of the present invention will be apparent to persons of ordinary skill in the art.

Additive manufacturing, especially laser additive manufacturing, has become a powerful tool to replace conventional manufacturing methods such as casting and hot spray, due to additive manufacturing's cost effectiveness and capability of making complex structures and compositions. Laser additive manufacturing, for example selective laser melting, uses powder materials or small parts to build three dimensional parts with complex structures. Laser additive manufacturing has proved to be an efficient, robust, and cost effective way for next generation manufacturing. Additive manufacturing processes for many industrial metals like titanium, having a melting temperature of about 1668° C., and aluminum, having a melting temperature of about 650° C., are well established materials for additive manufacturing and many remarkable results have been reported by using Continuous-Wave (CW) or long-pulsed lasers. However, due to the nature of CW lasers, heat affected zone limits the process's control of the microstructure, the residual stress, the resolution (>35 μm), and the quality of micro-sized features (such as strength and surface roughness). The parts made with current additive manufacturing systems still need post processing to polish, anneal, cut, trim, and structure. This significantly contributes to extra labor and cost. Moreover, current additive manufacturing systems lack efficient ways to do pre-, in-, and post process detection of defects, cracks, surface roughness, and alloy composition, thus making it very challenging to manufacture components for small modular reactors (SMR), for example, which need to be able to withstand higher operating temperatures and plasma radiation while at the same time maintaining stability, environmental resistance, and mechanical properties.

Fundamentally, at the heart of any additive manufacturing process is the energy source that powers the thermodynamic forces that drive the metallurgical transformations that produce the microstructures that define the quality of the manufactured metallic parts. In order to make certifiable additive manufactured parts (i.e. defect and residual stress free parts with controlled microstructure and narrow tolerances), it is critical to control all aspects of the energy delivery system. There are multiple parameters that control the microstructure and properties of additive manufactured parts, such as the powder size distribution; powder layer thickness; powder flow rate; energy beam spot size; melt pool temperature profile; the cooling rate; melt flow dynamic characteristics; evaporation rates and many others. As the process volume becomes smaller (to better control dimensional tolerances and microstructure) and as the process energy scanning speeds become faster (due to the faster heating and cooling rates associated with the smaller volumes) the requirements for higher precision, adaptability, and agility of the energy source become more stringent. Unfortunately, the existing energy sources do not have these characteristics.

Additionally, the additive manufacturing process has inherent pre-, in-, and post-process variabilities associated with the powder size distribution, small processing volumes, high processing energies and fast scanning speeds that can affect the layer quality (such as surface roughness, microstructure distribution, residual stresses, alloy composition changes, and defects). Accounting and correcting these variabilities is critical in building quality metal or ceramic additive manufactured parts. Since feedback control of the energy processing source is nearly impossible at the typical processing speeds found in most additive manufacturing systems, it is highly desirable that as much information as possible is gathered of each layer before additive manufacturing consolidation as well as after additive manufacturing consolidation for purposes of feedforward control. Parameters such as: the powder layer quality and thickness prior to melting; the monitoring of certain aspects of the melting process (power level, melt pool temperature); and the quality of the finished layer (surface profile, defect distribution) after the melting process are critical for building quality additive manufactured parts via feedback control and/or feedforward control.

Given these challenges, methods and apparatuses for additive manufacturing with feedback and feedforward control are needed. The methods and apparatuses of the invention described herein may solve these shortcomings as well as others by proposing a novel method and apparatus for real time, in situ sensing and characterization of roughness, composition, defects, and temperature in three-dimensional manufacturing systems.

FIG. 1 is a schematic illustration of an apparatus for real time, in situ sensing and characterization of roughness, composition, defects, and temperature in three-dimensional manufacturing, in accordance with some embodiments.

In some embodiments, apparatus 100 comprises a laser 105 and an acousto-optic modulator 110 to generate a high energy, high power laser pulse 115, a computer 120, an autofocusing scanner 125, a dichroic filter 130, an imager and processor 135, such as a CCD, a linear and rotary motor stage 140, a powder injection system 145, a laser induced breakdown spectroscopy (LIBS) filter 150, and a LIBS spectrometer 155. In some embodiments, the stage 140 with an additively manufactured sample 160 may be enclosed in a chamber 165 filled with a shield gas 170 such as argon, helium, nitrogen, and/or hydrogen to help the sample avoid oxidation and chemical reaction or interaction with air. In an alternative embodiment, the chamber 165 only substantially encloses the sample 160 being additively manufactured and not the stage 140.

A powder spreading system (not shown in FIG. 1) is also included in the 3D printing system to spread a thin layer of powder (same or dissimilar with the previous layer) on top of the previously processed layer.

The laser pulse 115 has a tunable pulse repetition rate (PRR) between about 100 kHz and about 1 GHz, an average power of about 1 kW, a tunable pulse width between about 750 fs to about 10 ns, a maximum output pulse energy of about 500 µJ, and a center wavelength of about 1030 nm to about 1100 nm or other wavelength in the UV-IR spectral region (matching the best material absorption need for the additive manufacturing AM process and subtractive manufacturing SM process). The laser can be tuned to work for both AM process (layer melting, manipulation of microstructures through tuning of pulse width or spatial shape or temporal shape) and SM process (trimming of defects and geometrical shapes, hole drilling, surface microstructure modification, surface peening, surface polishing, etc.). In some embodiments, the computer 120 is first used to convert CAD design to 3D printing procedures and contours. The conversion may also been done on some external computing device that is not part of the apparatus. The computer will be used to process and analyze in about real-time the data gathered from the imaging and sensing and to feedback to the three-dimensional manufacturing system to adjust the additive manufacturing laser, process, and powder parameters, such as laser power, pulse width, energy, pulse repetition rate, beam shape, temporal format, scanning speed, hatching space, scanning strategy/pattern, powder thickness, etc., before either the next layer is additively manufactured or the current layer is repaired. The computer 120 is used to control the PRR, to control the power of the laser 105, to coordinate the scanner (scan speed, hatching space, scan pattern, focal position) 125, to control the delivery of the powder 175 from the powder injection system 145, to control the linear and rotary motorized stages 140, and to interface with the LIBS spectrometer 155. In some embodiments, more than one computer is used to control and monitor. The high energy, high power pulse 115 is coupled into the auto focusing scanner 125 which scans and focuses the pulse 115 onto the sample 160 being manufactured from the powder 175 being injected by the powder injection system 145, which has an adjustable flow rate, onto the stage at first and then subsequent layers of the sample 160, resulting in a strong weld/bond between the sample and the powder. The focal spot size of the laser pulse may be varied by the focusing lens 127. Beam shaping optics positioned between the laser and the scanner may also be used to modify the beam from Gaussian shape to flat top (square or round). Using a flat top beam shape results in a more uniform processed area than using a Gaussian beam shape, which helps to significantly reduce the non-uniformity of the melting pool and eliminates unmelted powders and thus increases the density and reduces the residual stress of the sample. The sample 160, may be positioned using its own linear and rotary motor stages 140, in X, Y, Z, Θ, and Φ. The imager and processor 135 monitors the sample through the dichroic filter 130 as the sample 160 is being additively manufactured. The scanner 125 may be an acousto-optic type scanner (diffraction), a magnetic resonant scanner, a mechanical scanner (rotating mirror), or an electro-optic scanner, etc. The acousto-optic modulator 110 is used to optimize the laser pulse energy and format of pulses (pulsed modulated control in temporal domain) for melting pool temperature control, which further controls the temperature and cooling rate. A mechanical shutter may also be incorporated into the apparatus for safety. The apparatus is capable of layer-by-layer processing with micron level precision making complex shapes with fine structures achievable.

In some embodiments, a CW laser is combined with the laser to achieve both additive manufacturing and subtractive manufacturing, or any combination based on the required materials, functions, and processes. For example the CW laser may be used to do the additive manufacturing and the pulsed laser may be used for the subtractive manufacturing process.

For in situ identification and characterization of the temperature and materials in real time, the LIBS system is incorporated into the apparatus in a collinear configuration, i.e. in the same optical axis as the laser pulse, with the LIBS filter 150 which reflects the LIBS signal 180 into the LIBS spectrometer 155 for analysis. In some embodiments, the LIBS signal 180 is focused into an optical fiber 185 with a focusing lens 190. LIBS is a type of atomic emission spectroscopy that involves focusing a pulsed laser beam to generate plasma and excite a sample on the target surface, which can initially be in solid, liquid, or gaseous form. The LIBS system monitors in real time the melting pool temperature and alloy composition in the melt to characterize the surface/subsurface defects with micron precision. The LIBS system has the primary advantages of versatile sampling, rapid analysis, little to no sample preparation, sensitivity to a wide variety of elements, simultaneous analysis of multiple-elements, only small amounts of material required, and practically non-destructive. In an alternative embodiment, a separate fs laser can be incorporated in the 3D manufacturing system to detect the surface composition post the process.

In an alternate embodiment, a laser induced photoacoustic inspection (LIPI) system may be used in the apparatus to detect surface roughness and subsurface defects or cracks.

Figure 2:
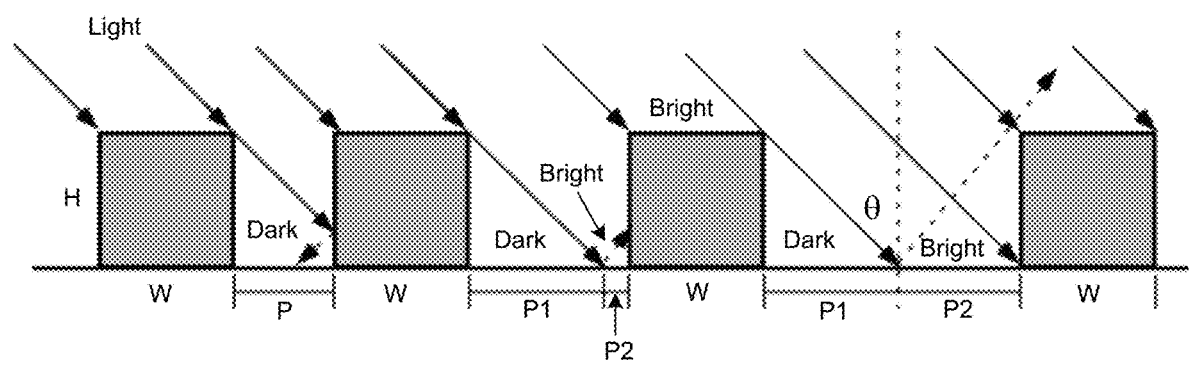
FIG. 2 is an illustration of surface structure impact on camera brightness, in accordance with some embodiments.

FIG. 2 is an illustration of surface structure impact on camera brightness, in accordance with some embodiments.

Figure 3:
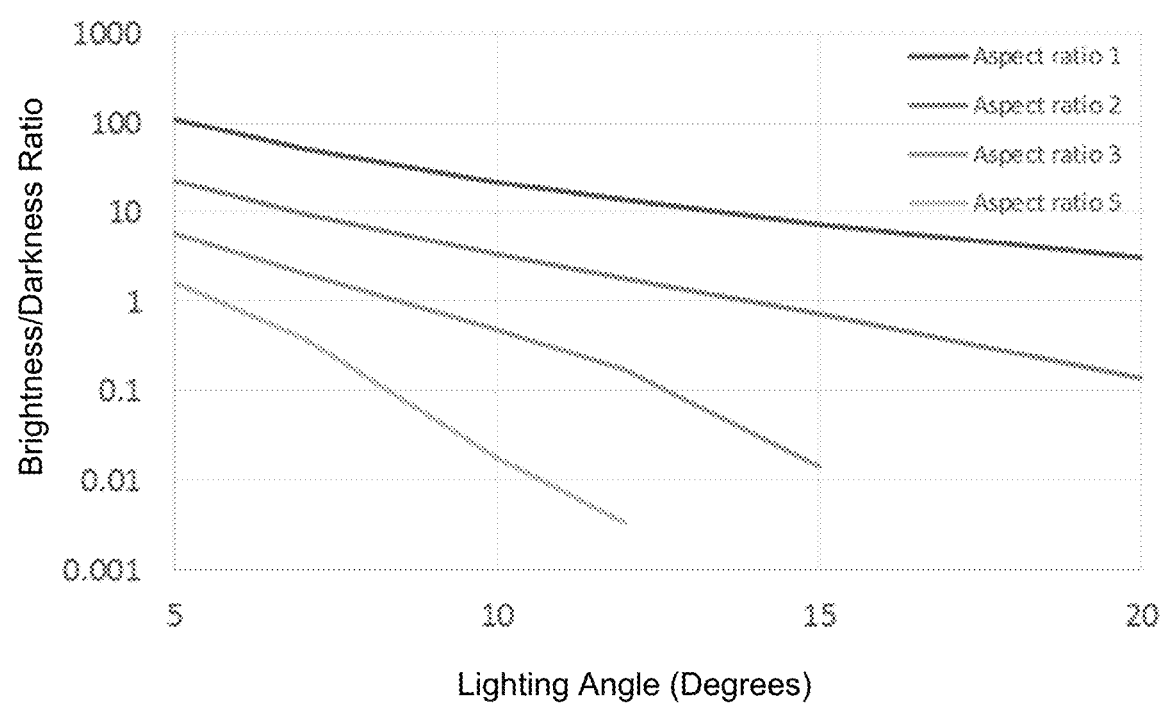
FIG. 3 is a plot of a simulation of the brightness to darkness ratio versus lighting angle, in accordance with some embodiments.

FIG. 3 is a plot of a simulation of the brightness to darkness ratio versus lighting angle, in accordance with some embodiments.

Figure 4A:
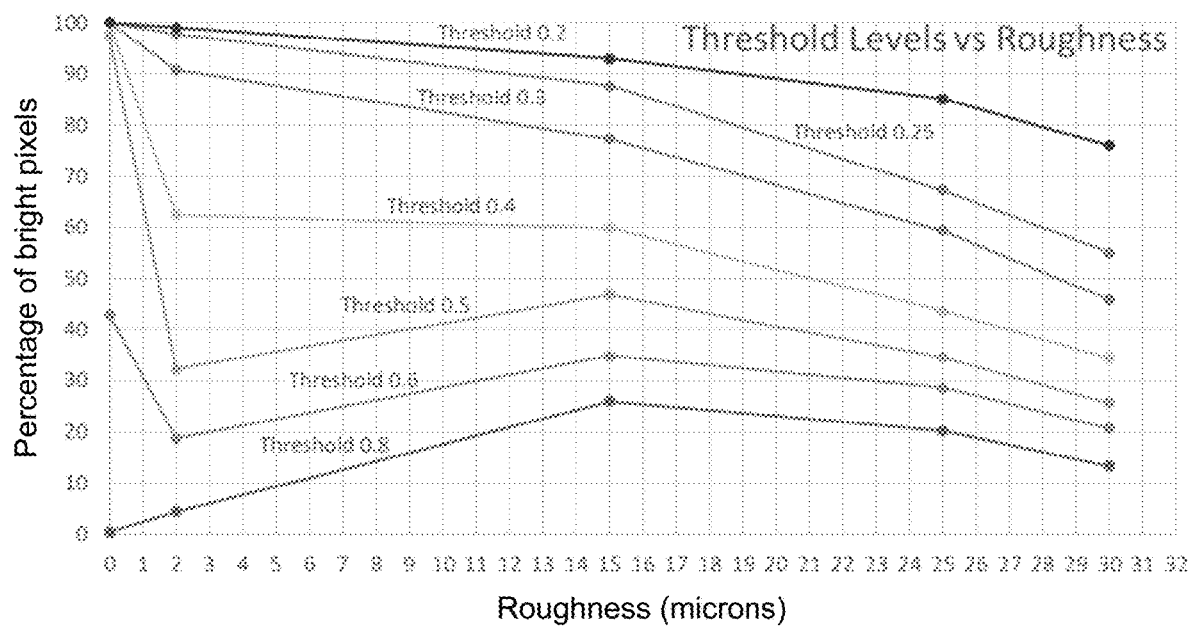
FIG. 4A is a plot of percentage of bright pixels versus roughness under different gray level threshold settings and FIGS. 4B, 4C, and 4D show two-dimensional images from a high resolution video camera and the corresponding threshold graphs for substrate surface roughness of less than 1 μm, 7 μm, and 30 μm, respectively, in accordance with some embodiments.
Figure 4B:
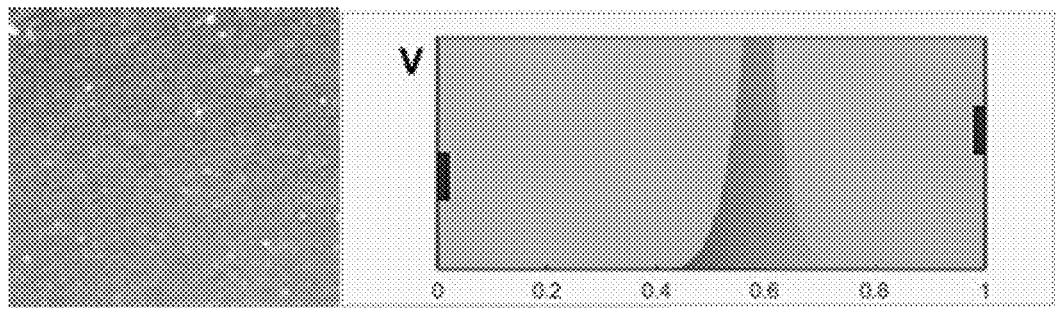
Figure 4C:
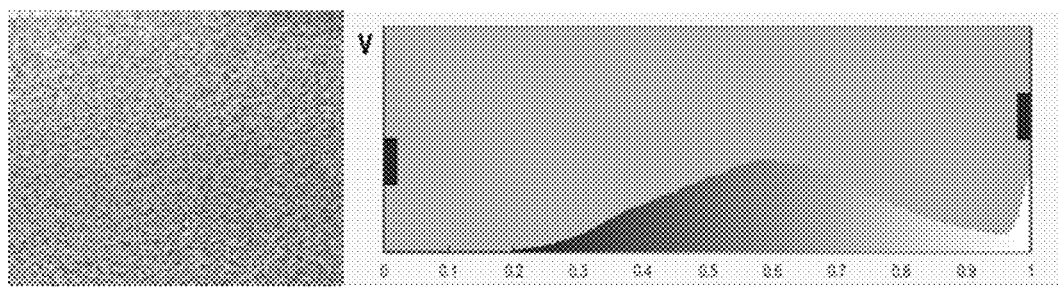
Figure 4D:
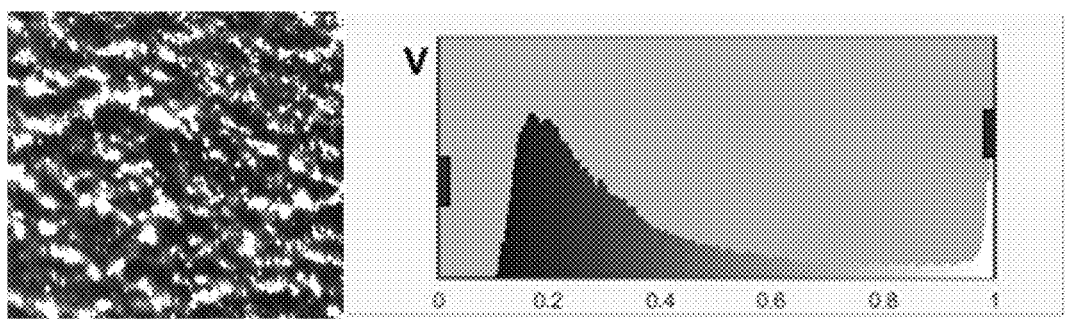

FIG. 4A is a plot of percentage of bright pixels versus roughness under different gray level threshold settings and FIGS. 4B, 4C, and 4D show two-dimensional images from a high resolution video camera and the corresponding threshold graphs for substrate surface roughness of less than 1 µm, 7 µm, and 30 µm, respectively, in accordance with some embodiments.

In addition to the data gathered from the LIBS system for feedback and feedforward control, the imager and processor is used to characterize the surface roughness, material, and shape from the geometrical data, since surface structure of the sample has a significant impact on the temperature characterization. The roughness data is used to calibrate and calculate the real emissivity of the additively manufactured sample and from the real emissivity, the real temperature of the sample may be calculated. In such an embodiment, the imager and processor comprises a thermal imager (MIR spectral regions 2-5 µm or 8-14 µm) taking two-dimensional thermal images or videos, and a high resolution visible camera to take two-dimensional images capable of identifying feature size of tens of microns in order to use the high resolution visible camera as a laser topographer. FIG. 2 illustrates the principal in using the brightness (intensity of the imager pixel) to probe for the roughness and period of structures of the sample. When lighting comes from a given angle, those areas unblocked by the peaks show bright regions in the imager while blocked regions show darkness. The brightness and darkness ratio (number of pixels) is a function of the lighting angle and aspect ratio. The ratio of brightness to darkness, grey level, is expressed in the following equation:

$$\text{Brightness/Darkness} = \{[(W+P)/H \tan \theta] - 1\}^2.$$

FIG. 3 is a plot of a simulation of the brightness to darkness ratio versus lighting angle and shows that the lighting angle needs to be less than 10-degrees in order to achieve a good contrast and in order for the high resolution visible camera to function as a laser topographer. FIG. 4A shows that a brightness or gray level threshold between 0.2 to 0.35 provides the best spread in the ratio of the percentage of bright pixels to roughness. At these threshold levels, as the roughness increases, the number of dark pixels increases, thus decreasing the percentage of bright pixels. Hence, by using the high resolution visible camera with a brightness or gray level threshold between 0.2 to 0.35 to measure the percentage of bright pixels, the surface roughness can accurately be determined. FIGS. 4B, 4C, and 4D show images from a high resolution video camera with a lighting angle of about fifteen degrees and the corresponding threshold graphs for substrate surface roughness of less than 1 µm, 7 µm, and 30 µm, respectively. Once the roughness data is obtained, the thermal imager can use it as a calibration data for emissivity to extract a true temperature distribution map and a true melting pool temperature.

Figure 5A:
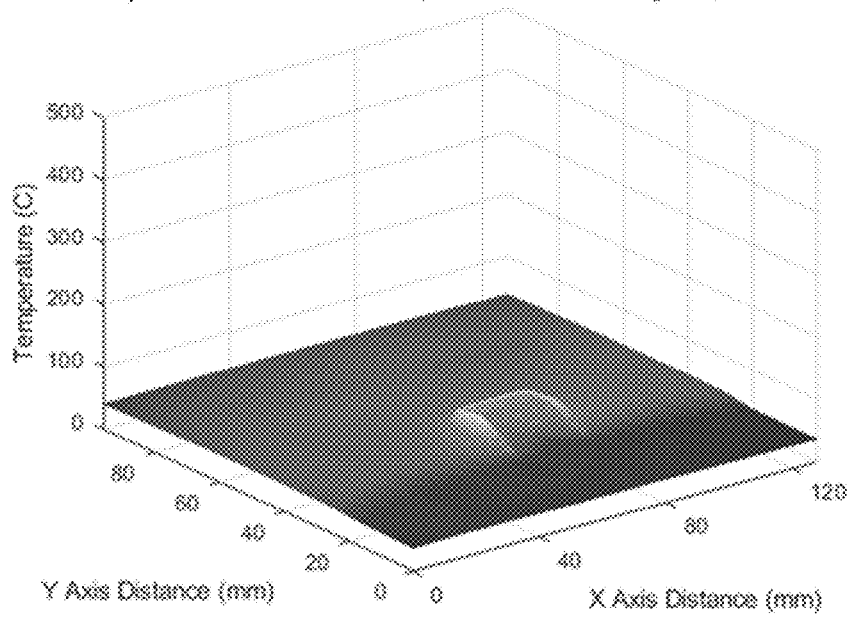
FIGS. 5A and 5B show the two-dimensional temperature distribution directly measured from a thermal camera without calibration for emissivity and FIGS. 5C and 5D show that calibrating for emissivity results in a true temperature measurement, in accordance with some embodiments.
Figure 5B:
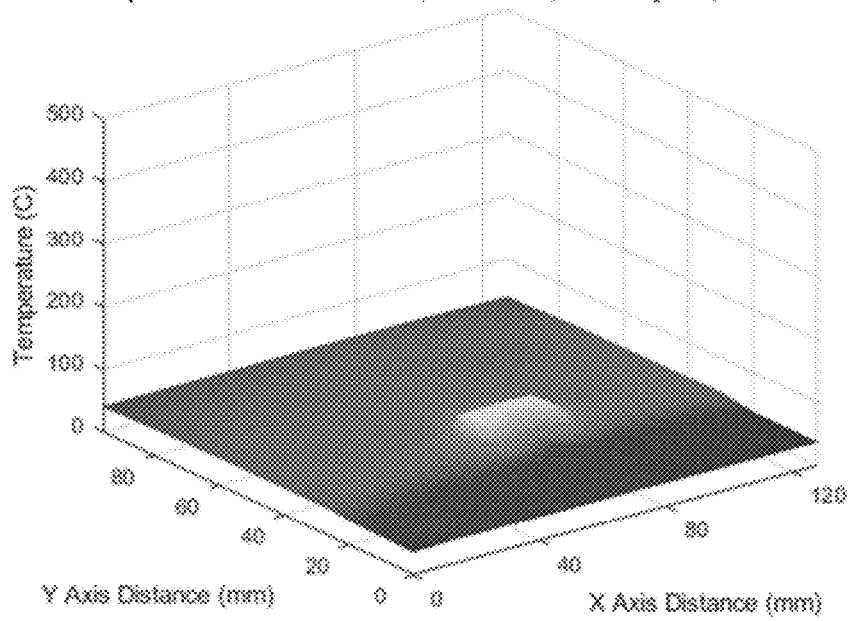
Figure 5C:
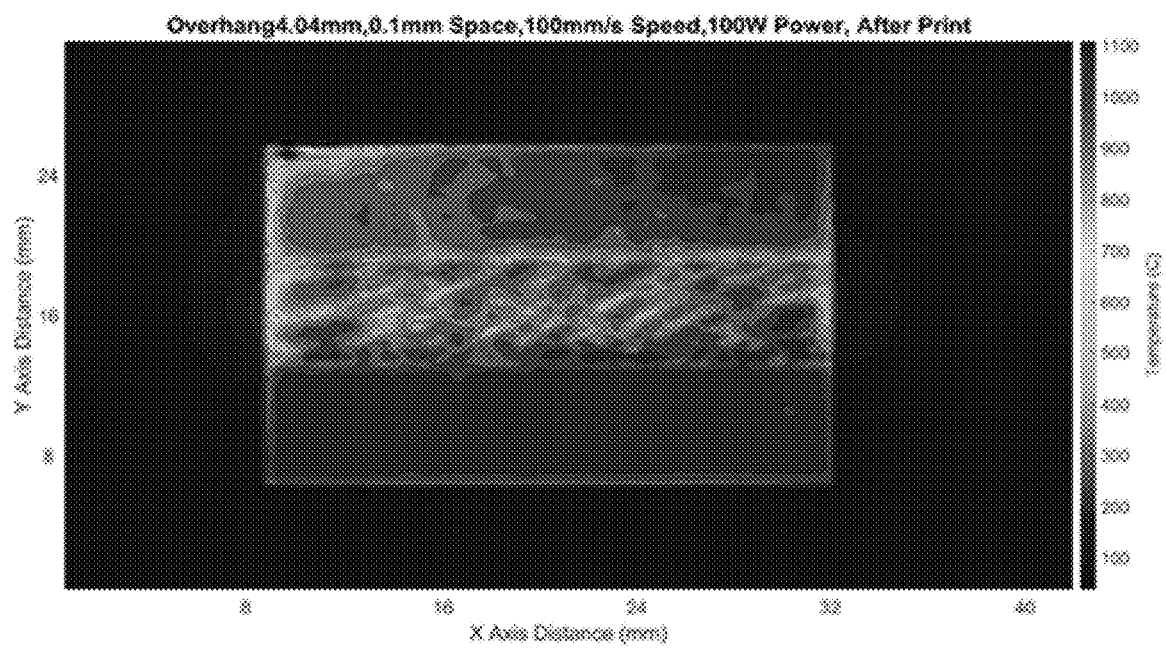
Figure 5D:
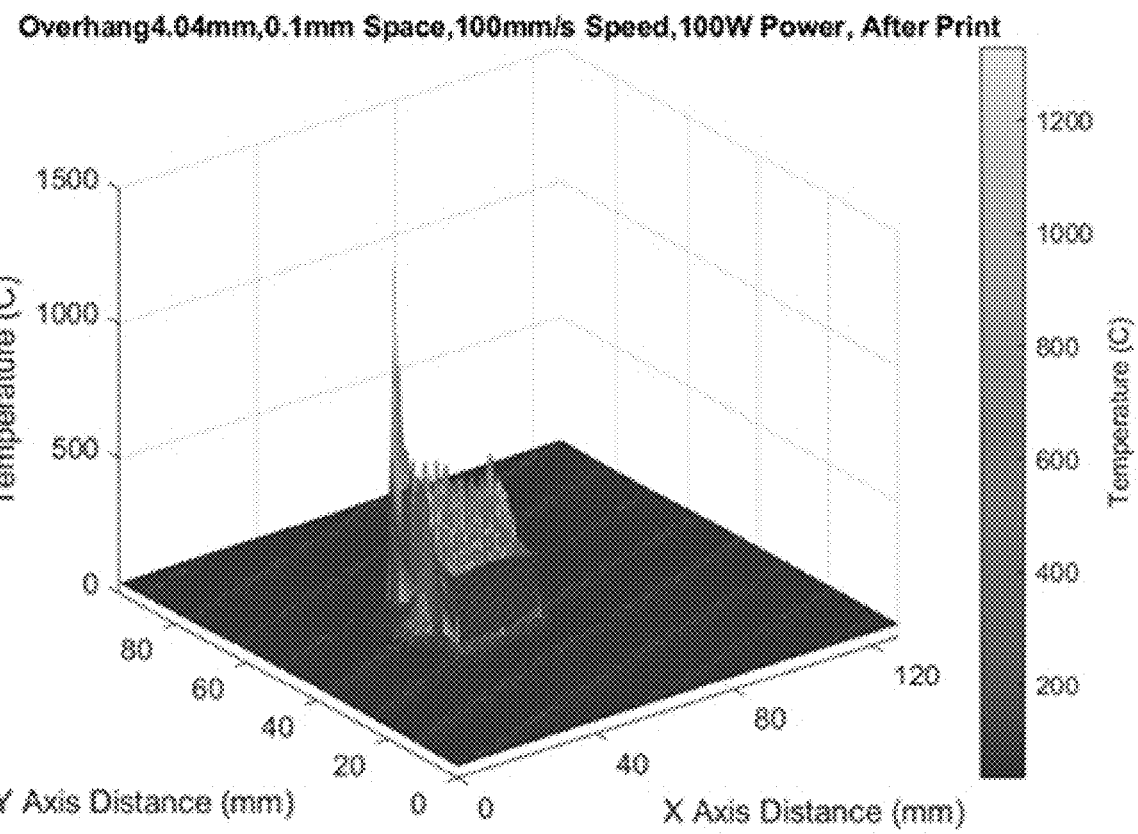
Figure 6:
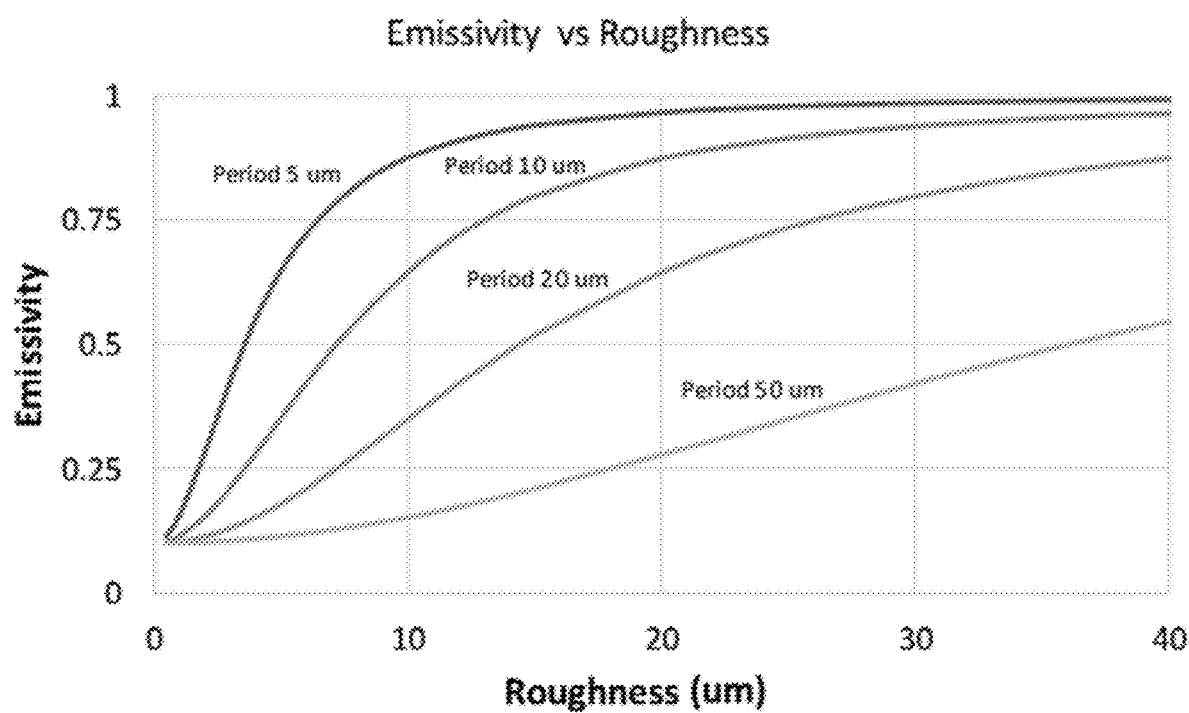
FIG. 6 is a plot of emissivity as a function of surface roughness, in accordance with some embodiments.
Figure 7:
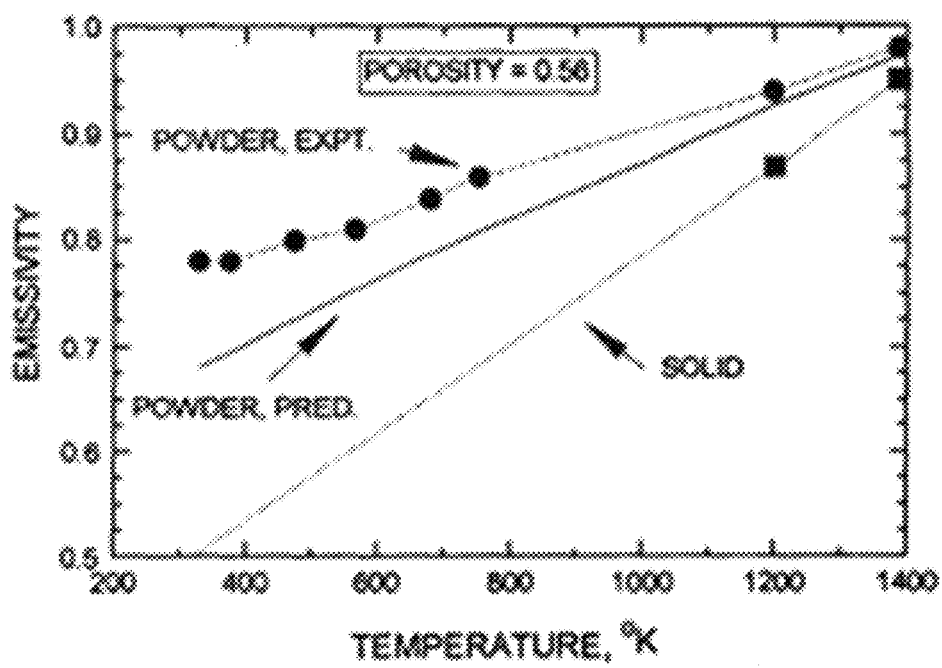
FIG. 7 is a plot of emissivity as a function of temperature, in accordance with some embodiments.

During three-dimensional manufacturing, it is important after deposition of each layer to calibrate for emissivity due to the roughness of the sample in order to accurately determine the temperature of the sample. FIG. 5A shows a two-dimensional temperature distribution after the deposition of a 25 mm×25 mm layer. The print area looks to have a relatively low temperature. However, after powder is spread, the two-dimensional temperature distribution of FIG. 5B shows that the temperature of the additively manufactured part has increased dramatically, which is not possible. This indicates that surface structure impacts the true temperature measurement of the sample. Thus calibration for emissivity due to the roughness of the sample is a must in order to correctly measure the temperature of the sample. From the temperature distribution, thermal induced stress information and fatigue information may be obtained. FIG. 5C and FIG. 5D show that a true temperature measurement is possible when a calibration for emissivity of an overhang printed layer is accounted for. FIG. 6 shows the emissivity for steel as a function of surface roughness for roughness periods of 5 µm, 10 µm, 20 µm, and 50 µm. As the roughness of the sample increases, the emissivity also increases. FIG. 7 shows the emissivity of steel powder, experimentally determined and predicted, as well as the emissivity of solid steel as a function of temperature. Thus the temperature of the sample, may be determined by using the high resolution visible camera to estimate the roughness and from the roughness estimate the emissivity and ultimately the calibrated temperature of the sample.

Figure 8:
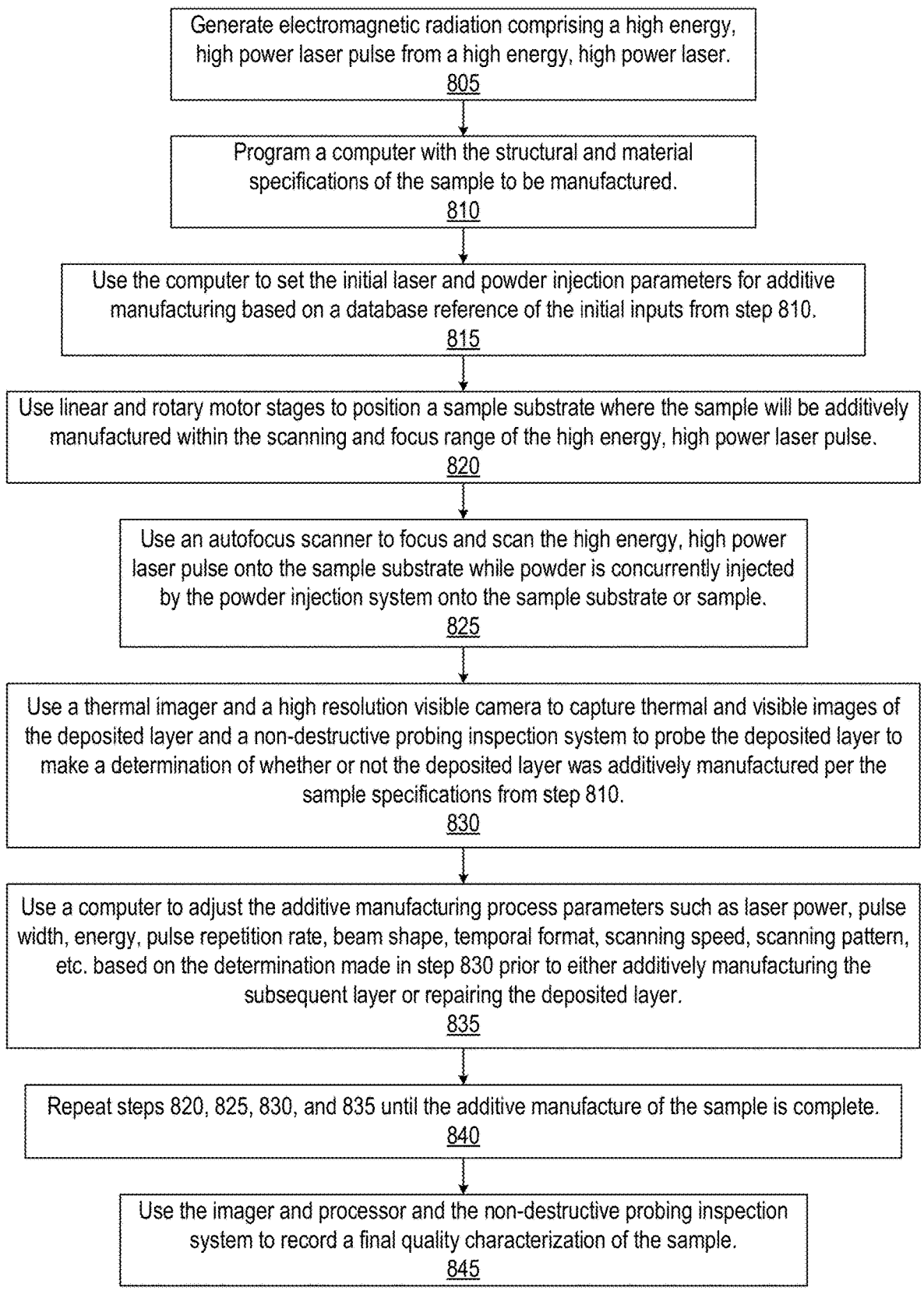
FIG. 8 is a block diagram illustrating a method for real time, in situ sensing and characterization of roughness, composition, defects, and temperature in three-dimensional manufacturing, in accordance with some embodiments.

FIG. 8 is a block diagram illustrating a method for real time, in situ sensing and characterization of roughness, composition, defects, and temperature in three-dimensional manufacturing, in accordance with some embodiments.

In some embodiments, processing begins at step 805 where a high energy, high power laser is used to generate electromagnetic radiation comprising a high energy, high power laser pulse. The high energy, high power laser pulse will have a tunable PRR between about 100 kHz up to about 1 GHz, an average power of about 1 kW, a tunable pulse width between about 750 fs to about 1 ns, a maximum output pulse energy of about 500 µJ, and a center wavelength of about 1030 nm or any wavelength from UV-IR, that matches the material absorption needs for the additive manufacturing process. At step 810, a computer is programmed with the structural and material specifications of the sample to be manufactured. Next, at step 815, the computer sets the initial laser and powder injection parameters for additive manufacturing based on a database reference of the initial inputs from step 810. At step 820, linear and rotary motor stages are used to position a sample substrate where the sample will be additively manufactured within the scanning and focus range of the high energy, high power laser pulse. At step 825, using an autofocusing scanner, the high energy, high power laser pulse is focused and scanned onto the sample substrate while powder is concurrently injected by the powder injection system onto the sample substrate. In subsequent layers, the high energy, high power laser pulse is focused and scanned onto the previously deposited layer of the sample. At step 830, a determination is made of whether or not the just deposited layer was additively manufactured per the sample specifications from step 810 by capturing images (thermal images and visible images) of the additively manufactured sample with a thermal imager and a high resolution visible camera as well as probing the deposited layer with a non-destructive probing inspection system, such as with a LIBS or LIPI system. A modeling algorithm will be used to justify the layer quality to estimate or predict the quality of the deposited layer and then feedback to the additive manufacturing control system. With the information of roughness, surface shape, temperature distribution, and deposition, the information related to residual stress, fatigue, microstructure, tensile strength and hardness, etc. may be extracted. The computer will be used to process and analyze in about real-time the data gathered from the imaging and sensing. If any defects are detected, at step 835, the computer is used to feedback to the three-dimensional manufacturing system to adjust the additive manufacturing laser, process, and powder parameters, such as laser power, pulse width, energy, pulse repetition rate, beam shape, temporal format, scanning speed, hatching space, scanning strategy/pattern, powder thickness, etc., before either the next layer is additively manufactured or the current layer is repaired. At step 840, steps 820, 825, 830, and 835 are repeated until the additive manufacture of the sample is complete. After completion of the sample, at step 845, the sample is imaged and inspected by the imager and processor (thermal imager and high resolution visible camera) and the non-destructive probing inspection system to record a final quality characterization of the sample. Although the flowchart may describe the operations as a sequential process, the operations may be performed in parallel or concurrently. In addition, the order of the operations may be rearranged.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages that may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

The invention claimed is:

1. A method for real time, in situ sensing and characterization of roughness, geometrical shapes, geometrical structures, composition, defects, and temperature in three-dimensional manufacturing comprising:
    (a) providing an apparatus having:
        one or more lasers configured to generate electromagnetic radiation;
        an autofocusing scanner configured to receive the electromagnetic radiation from the one or more lasers and to focus and scan the electromagnetic radiation onto a stage where a sample is three-dimensionally manufactured;
        a powder injection system configured to inject one or more powders toward the stage in the vicinity of the focused electromagnetic radiation;
        a powder spreading system configured to spread one or more powders to form a powder layer onto a previously processed layer of the sample;
        a dichroic filter positioned between the autofocusing scanner and the stage;
        an imager and processor focused through the dichroic filter and onto the sample, wherein the imager and processor are configured to monitor structure, temperature, shape, defects, cracks, and roughness of the sample;
        a non-destructive probing inspection system configured to monitor the composition of the sample; and
        one or more computers coupled to the one or more lasers, the autofocusing scanner, the stage, the powder injection system, the powder spreading system, the imager and processor, and the non-destructive probing inspection system and configured to monitor in about real-time one or more three-dimensional manufacturing parameters and provide control feedback to the apparatus;
    (b) programming the one or more computers with structural and material specifications of the sample;
    (c) using the one or more computers to set initial laser, scan parameters, and powder injection and/or spreading parameters based on the structural and material specifications of the sample programmed into the one or more computers;
    (d) adjusting the stage in order to position the sample within the scanning and focus range of the electromagnetic radiation;
    (e) using the autofocusing scanner to focus and scan the electromagnetic radiation onto the sample while powder is concurrently injected by the powder injection system and/or spreading system onto the sample in order to deposit a layer onto the sample;
    (f) use the imager and processor to capture two-dimensional images of the sample and the non-destructive probing inspection system to probe the sample to make a determination of whether or not the deposited layer was manufactured per the structural and material specifications of the sample;
    (g) using the one or more computers to adjust the one or more three-dimensional manufacturing parameters based on the determination made in step (f) prior to either additively manufacturing a subsequent layer onto the sample or making repairs to the deposited layer; and
    (h) repeating steps (d), (e), (f), and (g) until the three-dimensional manufacture of the sample is complete.

2. The method of claim 1, wherein the method further comprises using the imager and processor and the non-destructive probing inspection system to record a final quality characterization of the sample.

3. The method of claim 1, wherein making a determination of whether or not the deposited layer was manufactured per the structural and material specifications of the sample comprises:
    extracting structure and roughness data of the surface of the sample from the grey level of the captured two-dimensional images of the sample illuminated with light at a known angle relative to the surface of the sample;
    using the structure and roughness data of the surface of the sample to calculate emissivity; and
    calculating the temperature of the sample by calibrating the captured two-dimensional images with the calculated emissivity.

4. The method of claim 3, wherein the structure and roughness data comprises stress and fatigue information of the sample.

5. The method of claim 1, wherein the imager and processor comprises a thermal IR imager and a high resolution visible camera.

6. The method of claim 5, wherein the thermal IR imager operates within a spectral region of 3-14 μm, and the high resolution visible camera has at least 10 megapixels.

7. The method of claim 1, wherein the one or more three-dimensional manufacturing parameters comprises laser power, pulse width, energy, pulse repetition rate, beam shape, temporal format, scanning speed, hatching space, scanning strategy/pattern, and/or powder thickness.

8. The method of claim 1, wherein the non-destructive probing inspection system comprises a collinear LIBS system to detect composition and temperature of melting points.

9. The method of claim 1, wherein the non-destructive probing inspection system comprises a LIPI system to detect subsurface defects and surface roughness.

10. The method of claim 1, wherein one of the one or more lasers comprises a CW or pulsed fiber laser and an acousto-optic modulator configured to control temporal format.

11. The method of claim 1, wherein the electromagnetic radiation comprises a wavelength between about 1030 nm to about 1100 nm, a pulse repetition rate between about 100 kHz and about 1 GHz, a pulse width between about 750 fs to about 10 ns, a pulse energy having a maximum of 500 µJ, and an average power of about 1 kW.

12. An apparatus for real time, in situ sensing and characterization of roughness, geometrical shapes, geometrical structures, composition, defects, and temperature in three-dimensional manufacturing comprising:
- one or more lasers configured to generate electromagnetic radiation;
- an autofocusing scanner configured to receive the electromagnetic radiation from the one or more lasers and to focus and scan the electromagnetic radiation onto a stage where a sample is three-dimensionally manufactured;
- a powder injection system configured to inject one or more powders toward the stage in the vicinity of the focused electromagnetic radiation;
- a powder spreading system configured to spread one or more powders to form a powder layer onto a previously processed layer of the sample;
- a dichroic filter positioned between the autofocusing scanner and the stage;
- an imager and processor focused through the dichroic filter and onto the sample, wherein the imager and processor are configured to monitor structure, temperature, shape, defects, cracks, and roughness of the sample;
- a non-destructive probing inspection system configured to monitor the composition of the sample; and
- one or more computers coupled to the one or more lasers, the autofocusing scanner, the stage, the powder injection system, the powder spreading system, the imager and processor, and the non-destructive probing inspection system and configured to monitor in about real-time one or more three-dimensional manufacturing parameters and provide control feedback to the apparatus.

13. The apparatus of claim 12, wherein the one or more computers configured to monitor in about real-time one or more three-dimensional manufacturing parameters comprises:
- processing and analyzing in about real-time data gathered from the imager and processor and the non-destructive probing system to determine the temperature of the sample by extracting structure and roughness data of the surface of the sample from the grey level of captured two-dimensional images of the sample illuminated with light at a known angle relative to the surface of the sample;
- using the structure and roughness data of the surface of the sample to calculate emissivity; and
- using the calculated emissivity to calibrate the two-dimensional images captured by the imager and processor.

14. The apparatus of claim 13, wherein the structure and roughness data comprises stress and fatigue information of the sample.

15. The apparatus of claim 12, wherein the imager and processor comprises a thermal IR imager and a high resolution visible camera.

16. The apparatus of claim 15, wherein the thermal IR imager operates within a spectral region of 3-14 µm, and the high resolution visible camera has at least 10 megapixels.

17. The apparatus of claim 12, wherein the one or more three-dimensional manufacturing parameters comprises laser power, pulse width, energy, pulse repetition rate, beam shape, temporal format, scanning speed, hatching space, scanning strategy/pattern, and/or powder thickness.

18. The apparatus of claim 12, wherein the non-destructive probing inspection system comprises a collinear LIBS system to detect composition and temperature of the melting points.

19. The apparatus of claim 12, wherein the non-destructive probing inspection system comprises a LIPI system to detect subsurface defects and surface roughness.

20. The apparatus of claim 12, wherein one of the one or more lasers comprises a CW or pulsed fiber laser and an acousto-optic modulator configured to control temporal format.

21. The apparatus of claim 12, wherein the electromagnetic radiation comprises a wavelength between about 1030 nm to about 1100 nm, a pulse repetition rate between about 100 kHz and about 1 GHz, a pulse width between about 750 fs to about 10 ns, a pulse energy having a maximum of 500 µJ, and an average power of about 1 kW.

* * * * *